United States Patent Office 3,746,696
Patented July 17, 1973

3,746,696
CATALYST SYSTEMS FOR POLYMERIZING ALICYCLIC OLEFINS
William A. Judy, Akron, Ohio, assignor to The Goodyear Tire & Rubber Company, Akron, Ohio
No Drawing. Filed Mar. 25, 1971, Ser. No. 128,116
Int. Cl. C08f 1/34, 5/00
U.S. Cl. 260—93.1                              7 Claims

ABSTRACT OF THE DISCLOSURE

There is disclosed a process for polymerizing unsaturated alicyclic compounds which comprises contacting said unsaturated alicyclic compounds with a catalyst system comprising (A) at least one tungsten carbonyl complex compound selected from the group consisting of triphenylphosphine tungsten pentacarbonyl; tri-n-butylphosphine tungsten pentacarbonyl; bistriphenylphosphine) tungsten tetracarbonyl; bisphenylamine)-tungsten tetracarbonyl; bis(diethylamine) tungsten tetracarbonyl; bis (pyridine) tungsten tetracarbonyl; 2,2'-dipyridyl tungsten tetracarbonyl; orthophenanthroline tungsten tetracarbonyl; 3,4,7,8-tetramethyl ortho-phenanthroline tungsten tetracarbonyl; diethylene triamine tungsten tricarbonyl; 1,2,3-triaminopropane tungsten tricarbonyl; 2,2',2''-tripyridyl tungsten tricarbonyl; tris(acetonitrile) tungsten tricarbonyl; tris(propionitrile) tungsten tricarbonyl; mesitylene tungsten tricarbonyl and toluene tungsten tricarbonyl, and (B) at least one reducing agent selected from a group consisting of trialkylaluminum, dialkylaluminum halide, alkylaluminum dihalide, aluminum chloride and aluminum bromide and optionally, a third catalyst component selected from a group consisting of halides, cyanogen halides, peroxides, hydroperoxides and molecular oxygen.

This invention relates to a process for polymerizing unsaturated alicyclic olefins and to catalyst systems useful in said process. In its broadest respect the invention is directed to the preparation of polymers derived from unsaturated alicyclic compounds which contain at least one alicyclic ring structure and at least one carbon-to-carbon double bond.

In a more narrow respect the invention is directed to the discovery of new catalyst systems useful in the preparation of these polymers.

The polymerization process of this invention may be employed to prepare solid polymers whose properties and characteristics can be tailor-made to fit a wide variety of uses and fields of application. The properties of the polymers resulting from the polymerization process of this invention can be varied over a wide range depending upon the particular unsaturated alicyclic monomer chosen to be polymerized, the particular polymerization catalyst employed and the particular polymerization conditions employed. The products resulting from the polymerization process of this invention can be employed in a variety of applications. For example, when they are elastomeric in nature they may be employed to produce finished rubber articles such as pneumatic tires, molded goods and the like, or, when they are plastic in nature they may be materials which are useful to manufacture articles such as films and fibers and also useful to form finished products by molding techniques.

One object of the present invention is to provide a process for the ring-opening polymerization of unsaturated alicyclic compounds. Another object is to provide novel catalyst systems capable of effectuating the ring-opening polymerization of said unsaturated alicyclic compounds. Further objects will become apparent as the description of this invention proceeds.

It has been found that unsaturated alicyclic compounds can be polymerized through a ring-opening polymerization mechanism employing a novel two-component catalyst system in which one of the catalyst components is a complex compound of tungsten carbonyl. Accordingly, this invention comprises the ring-opening polymerization of at least one unsaturated alicyclic compound selected from the group consisting of (1) unsaturated alicyclic compounds containing 4 to 5 carbon atoms in the cyclic ring and containing one carbon-to-carbon double bond in the cyclic ring, and (2) unsaturated alicyclic compounds containing from 8 to 12 carbon atoms in the cyclic ring and containing at least one carbon-to-carbon double bond in the cyclic ring, by intimately contacting said unsaturated alicyclic compounds with a catalyst system comprising (A) at least one compound selected from the group consisting of the products of the reaction of tungsten hexacarbonyl with a compound selected from the group consisting of organophosphines, amines, mono- and difunctional heterocyclic amines, trifunctional amines, nitriles and trifunctional aromatic compounds, and (B) at least one reducing agent selected from a group consisting of trialkylaluminum, dialkylaluminum halide, alkylaluminum dihalide, aluminum chloride and aluminum bromide.

The (A) catalyst component of the present invention may be prepared by either refluxing a mixture of tungsten hexacarbonyl with the appropriate organophosphine, amine, mono- or difunctional heterocyclic amine, trifunctional amine, nitrile or trifunctional aromatic compound in an ether solvent or by subjecting said reaction mixture to ultraviolet radiation. A general description of these methods for preparing the tungsten carbonyl complex compounds of the present invention can be found in an article by R. G. Angelici and Sr. Mary Diana Malone in the Journal of Inorganic Chemistry, vol. 6, No. 9, Sept., 1967 (pages 1731–1732) and a note by D. P. Tate, W. R. Knipple, and J. M. Augl, Journal of Inorganic Chemistry, vol. 1, No. 2, May 1962 (pages 433–434). The reactions are quantitative and the number of carbonyl (CO) groups replaced during the reaction will be dependent upon the relative amounts of the starting materials employed. Thus, it is possible to replace at least 1, 2 or 3 carbonyl groups of the original tungsten hexacarbonyl with a compound selected from the group set forth hereinabove.

Representative examples of the materials useful in preparing the tungsten carbonyl complex compounds of the present invention include organophosphines such as triphenylphosphine, ethyldiphenylphosphine, triethylphosphine, tri-n-butylphosphine, tri-p-methylphenylphosphine, tri - p - methoxyphenylphosphine, diethylphenylphosphine and the like; primary, secondary and tertiary amines such as phenylamine, ethylamine, propylamine, isopropylamine, diethylamine, dimethylamine, diphenylamine, trimethylamine, triethylamine and the like; mono- and bifunctional heterocyclic amines such as pyridine, 2,2'-dipyridyl, orthophenanthroline, 3,4,7,8-tetramethyl ortho-phenanthroline and the like; trifunctional amines such as diethylenetriamine, 1,2,3-triaminopropane, 2,2',2''-tripyridyl, hexamethylenetetramine and the like; nitriles such as acetonitrile, propionitrile, butyronitrile and the like and trifunctional aromatic compounds such as benzene, toluene, mesitylene, biphenyl and the like.

Representative examples of tungsten carbonyl complex compounds prepared by the methods set forth above and useful as the (A) catalyst component include triphenylphosphine tungsten pentacarbonyl; tri-n-butylphosphine tungsten pentacarbonyl; bis(triphenylphosphine) tungsten tetracarbonyl; bis(phenylamine) tungsten tetracarbonyl; bis(diethylamine) tungsten tetracarbonyl; bis(pyridine) tungsten tetracarbonyl; 2,2'-dipyridyl tungsten tetracarbonyl, ortho-phenanthroline tungsten tetracarbonyl; 3,4, 7,8-tetramethyl ortho-phenanthroline tungsten tetracarbonyl, diethylenetriamine tungsten tricarbonyl, 1,2,3-triaminopropane tungsten, tricarbonyl, 2,2′,2″-tripyridyl tungsten tricarbonyl, tris (acetonitrile) tungsten tricarbonyl, tris (proprionitrile) tungsten tricarbonyl, mesitylene tungsten tricarbonyl, toluene tungsten tricarbonyl and the like.

Representative examples of the (B) catalyst component include tripropylaluminum, triethylaluminum, diethylaluminum chloride, diethylaluminum bromide, ethylaluminum dichloride, propylaluminum dichloride, aluminum chloride, aluminum bromide and the like.

The active catalyst species employed in this invention are prepared by mixing catalyst components (A) and (B) by known techniques. Thus, the active catalyst species may be prepared by preformed or in situ techniques. By "preformed" is meant the manner in which catalyst components (A) and (B) are mixed together prior to the exposure of either of these catalyst components to the monomer to be polymerized. By "in situ" is meant that catalyst components (A) and (B) are added separately to the monomer to be polymerized.

The amount of catalyst components (A) and (B) employed may be varied over a wide range of concentrations. The establishment of an arbitrary catalytic concentration for one of the catalyst components will determine the relative concentration of the remaining catalyst component. Thus, the relative concentrations of the catalyst components (A) and (B) are interdependent. This interdependency of the catalyst components (A) and (B) also depends on a number of other factors such as temperature, reactants used, purity of the reactants, reaction times desired and the like. Of course, a catalytic amount of catalyst must be employed and those skilled in the art will be readily able to determine the optimum catalytic range.

It has been found that successful results are obtained in the practice of this invention when the molar relationship between the catalyst components (A) and (B) as previously defined are within a molar ratio of $B/A$ ranging from about 1/1 to about 20/1.

The rate at which the unsaturated alicyclic compounds are polymerized and the yield of polyalkenamer can be increased by adding at least one compound selected from a group consisting of chlorine, bromine, iodine, cyanogen halide, peroxides, hydroperoxides, and molecular oxygen.

Representative examples of cyanogen halides, peroxides and hydroperoxides which will increase both the rate of polymerization and the yield of polyalkenamer include cyanogen halides such as cyanogen chloride, cyanogen bromide and cyanogen iodide; peroxides such as benzoyl peroxide, dicumyl peroxide, tertiarybutyl peroxide, ethyl peroxide and the like and hydroperoxides such as benzoyl hydroperoxide, tertiarybutyl hydroperoxide, cumene hydroperoxide and the like.

Various unsaturated alicyclic compounds may be employed in the practice of this invention. As is mentioned above, unsaturated alicyclic compounds containing from 4–5 carbon atoms in the cyclic ring and which contain one carbon-to-carbon double bond in the cyclic ring and unsaturated alicyclic compounds containing from about 8 to about 12 carbon atoms in the cyclic ring and which contain at least one carbon-to-carbon double bond are contemplated as being useful monomers in the practice of this invention.

The preferred unsaturated alicyclic compounds of this invention are those comprising a single unsaturated alicyclic ring. These alicyclic rings may be mono- or multi-substituted by such groups as alkyl, aryl, arylalkyl and halogen groups.

Representative examples of unsaturated alicyclic compounds containing a single alicyclic ring having from 4–5 carbon atoms in the cyclic ring and containing one double bond in the cyclic ring are cyclobutene and cyclopentene.

Representative examples of compounds having from about 8 to about 12 carbon atoms in the cyclic ring and having from 1 to 3 double bonds in said ring include cyclooctene, 1,4- and 1,5-cyclooctadiene, cyclononene, 1,4- and 1,5-cyclononadiene and 1,4,7-cyclononatriene cyclodecene, 1,4-, 1,5- and 1,6 - cyclododecadiene and 1,4,6- and 1,4,7-cyclododecatriene cycloundecene, 1,4-, 1,5- and 1,6-cyclododecadiene and 1,4,7- and 1,4,8-cycloundecatriene cyclododecene, 1,4-, 1,5- and 1,7-cyclododecadiene and 1,4,7-, 1,4,8-, 1,4,9- and 1,5,9-cyclododecatriene.

Examples of substituted unsaturated alicyclic compounds are alkyl-substituted compounds such as 1,5,9-trimethyl cyclododecatriene; aryl-substituted compounds such as 3-phenyl cyclooctene-1; alkaryl-substituted compounds such as 3-methyl phenyl cyclooctene-1; halogen-substituted compounds wherein the halogens are iodine, chlorine, bromine and fluorine such as 5-chloro-1,5-cyclooctadiene; 5 - bromo - 1,5-cyclooctadiene; 5-chloro-1,5,9-cyclododecatriene; 5-chloro cyclooctene-1; 3-bromocyclooctene - 1; 5 - chlorocyclododecene-1; 5,6-dichlorocyclooctene-1 and the like.

Mixtures of the unsaturated alicyclic compounds may be polymerized including both substituted unsaturated alicyclic compounds and the unsubstituted unsaturated alicyclic compounds.

The polymerizations of this invention may be conducted in solution or in bulk. When the polymerization is carried out in solution, solvents which do not adversely effect the polymerization are desired. Representative examples of useful solvents are liquid aromatic hydrocarbons such as benzene and toluene, hydrogenated aromatic hydrocarbons such as Tetralin, liquid aliphatic hydrocarbons such as pentane, hexane, petroleum ether and decane and alicyclic hydrocarbons such as cyclohexane, Decalin and cyclooctane.

Temperatures at which the polymerization reaction is carried out can be varied over a wide range. Usually the temperature can be varied from an extremely low temperature such as $-60°$ C. up to high temperatures such as $150°$ C. or higher. Thus the temperature is not a critical factor of this invention. It is generally preferred, however, to conduct the reaction at a temperature within the range of from about $-23°$ C. to about $80°$ C. The pressure at which the polymerization is carried out can also be varied over a wide range. The reaction can be conducted at atmospheric pressure or if desired, it can be carried out at either sub-atmospheric pressure or super atmospheric pressure. Generally, a satisfactory polymerization is obtained when the reaction is carried at about autogenous pressure developed by the reactants under the operating conditions used.

The polymerization time will vary and can range from a few seconds to 24 hours or more, depending upon the polymerization conditions and the degree and extent of polymerization desired. Generally, however, a satisfactory polymerization product is obtained in a matter of only a few minutes or hours.

The polymerization reaction may be carried out as a batch or as a continuous process. In performing the polymerizations of this invention the introduction of the monomer, catalyst and solvent, when a solvent is employed, can each be made to the reaction zone intermittently and/or continuously.

It is thought that the polymerizations of this invention take place through a ring-opening polymerization mechanism. Such ring-opening polymerizations of unsaturated alicyclic compounds can be used to make a number of alternating copolymers and terpolymers. For example, the ring-opening polymerization of cyclooctene yields a polyoctenamer which may be considered the alternating copolymer of one butadiene unit and two methylene units. The ring-opening polymerization of 1,5-cyclooctadiene leads to a polybutenamer which is equivalent to the 1,4-addition polymer of butadiene-1,3. The ring opening polymerization of 5-methyl cyclooctene-1 would yield the alternating terpolymer of ethylene, propylene and butadiene-1,3. The ring-opening polymerization of substituted unsaturated alicyclic monomers also leads to interesting copolymers and terpolymers.

Bulk polymerizations may be desirable from a process standpoint as relatively little heat appears to be involved per mol of unsaturated alicyclic monomer polymerized in practicing this invention. This constitutes the great advantage for this ring-opening type of polymerization over conventional addition polymerization processes.

The low volume decrease accompanying a ring-opening polymerization is another major advantage over conventional addition polymerization, particularly where these monomers are bulk polymerized to form potting compounds in various articles, the examples of which include molded plastic materials, molded rubberlike goods, shoe soles and heels, industrial belts an vehicular tires.

In these applications the monomer may be polymerized in the presence of one or more reinforcing carbon blacks, pigments or resins in certain antioxidants. The products made by this procedure may be crosslinked by adding polymerizable polyfunctional compounds, for example, bicyclopentadiene to the main monomer. The molded products made by ring-opening polymerization may be crosslinked by exposure to ionizing radiation such as gamma rays, X-rays and the like. These molded products may also be crosslinked or vulcanized by incorporating certain compounds which on heating, during or subsequent to the polymerization will lead to conventional crosslinking or vulcanization of these polymers.

The practice of this invention is further illustrated by reference to the following examples which are intended to be representative rather than restrictive of the scope of this invention. All experiments were conducted in an atmosphere of nitrogen unless noted otherwise and all percentages are percent by weight unless noted otherwise.

EXAMPLE I

A series of ring-opening polymerization experiments was carried out employing a premix consisting of 17.0 grams of freshly distilled cyclooctene and 80 milliliters of benzene in each of four 4-ounce bottles. All manipulations of charging monomer, solvent and catalyst were conducted under a nitrogen atmosphere. The catalyst employed consisted of a 0.05 molar (M) slurry of orthophenanthroline tungsten tetracarbonyl $[(o\text{-}Ph)W(CO)_4]$ in benzene and either a 0.2 M slurry of aluminum bromide $(AlBr_3)$ in cyclohexane or a 0.2 M slurry of aluminum chloride $(AlCl_3)$ in cyclohexane. The catalyst was charged to each bottle by means of the in situ technique with $(o\text{-}Ph)W(CO)_4$ added first, followed by the immediate addition of either $AlBr_3$ or $AlCl_3$. All experiments were allowed to react for 24 hours at ambient temperatures (approx. 23° C.). The results are summarized in Table 1 below:

TABLE 1

| Experiment number | $AlX_3$ | $(o\text{-}Ph)W(CO)_4$, millimoles | $AlX_3$, millimoles | Yield, weight percent |
|---|---|---|---|---|
| 1 | $AlCl_3$ | 0.05 | 0.4 | 40.0 |
| 2 | $AlCl_3$ | 0.05 | 0.6 | 47.6 |
| 3 | $AlCl_3$ | 0.05 | 0.8 | 36.7 |
| 4 a | $AlBr_3$ | 0.05 | 0.4 | 86.3 | a The dilute solution viscosity (DSV) of this polyoctenamer was found to be 1.64 deciliters per gram (dl./g.) as determined in benzene at 30° C.

EXAMPLE II

A series of ring-opening polymerization experiments was carried out wherein the monomer was polymerized in bulk, i.e. no solvent employed. To three 4-ounce bottles were added 25 milliliters of sodium distilled cyclooctene (CO). Each bottle was then flushed with nitrogen and tightly sealed. The catalyst components employed consisted of a 0.05 molar solution of triphenylphosphine tungsten pentacarbonyl $[\phi_3P)W(CO)_5]$ in benzene and a 0.20 molar solution of ethylaluminum dichloride (EADC) in benzene. To Experiment No. 3 was added molecular oxygen $(O_2)$ as an optional third catalyst component. All reactions were run at room temperature and terminated at the end of 24 hours. All pertinent data are contained in Table 2 below. Amounts of each catalyst component are given in terms of millimoles (mmoles):

TABLE 2

| Experiment Number | $(\phi_3P)W(CO)_5$, mmoles | EADC, mmoles | $O_2$, mmoles | Yield, weight percent | DSV |
|---|---|---|---|---|---|
| 1 | 0.15 | 3.0 | 0 | 16.0 | 4.57 |
| 2 | 0.15 | 6.0 | 0 | 30.0 | 1.12 |
| 3 | 0.15 | 3.0 | 0.45 | 89.0 | 3.34 |

EXAMPLE III

A series of ring-opening poymerization experiments was carried out on a polymerization premix similar to that in Example I. The catalyst components employed consisted of a 0.1 M solution of mesitylene tungsten tricarbonyl $[(\text{Mesitylene})W(CO)_3]$ in benzene and an aluminum (Al) containing component selected from a group consisting of a 0.2 M solution of EADC in benzene, a 0.2 M slurry of aluminum chloride $(AlCl_3)$ in cyclohexane and a 0.2 M slurry of aluminum bromide $(AlBr_3)$ in cyclohexane. All experiments were conducted at room temperature. Pertinent data are set forth in Table 3 below:

TABLE 3

| Experiment Number | Al component | Mmoles | (Mesitylene)$W(CO)_3$, mmoles | Reaction time, hrs. | Yield, weight percent |
|---|---|---|---|---|---|
| 1 | EADC | .4 | 0.2 | 1 | 88 |
| 2 | $AlBr_3$ | .4 | 0.2 | 20 | 12 |
| 3 | $AlCl_3$ | .4 | 0.2 | 20 | 14 |

EXAMPLE IV

A series of ring-opening polymerization experiments was carried out similar to those in Example III except that acetonitrile tungsten tricarbonyl $[(CH_3CN)_3W(CO)_3]$ was employed in place of $(\text{Mesitylene})W(CO)_3$. All experiments were carried out at ambient temperature and all pertinent data is contained in Table 4 below:

TABLE 4

| Experiment Number | Al component | Mmoles | $(CH_3CN)_3$-$W(CO)_3$, mmoles | Reaction time, hrs. | Yield, weight percent |
|---|---|---|---|---|---|
| 1 | EADC | .20 | .10 | 1 | 67 |
| 2 | $AlCl_3$ | .40 | .10 | 0.5 | 50 |
| 3 | $AlBr_3$ | .40 | .10 | 20 | 16 |

While certain representative embodiments and details have been shown for the purpose of illustrating the invention, it will be apparent to those skilled in this art that various changes and modifications may be made therein without departing from the spirit or scope of the invention.

What is claimed is:

1. A process comprising the ring opening polymerization of at least one unsaturated alicyclic compound selected from the group consisting of (1) unsaturated alicyclic compounds containing 4 to 5 carbon atoms in the cyclic ring and containing one carbon to carbon double bond in the cyclic ring and (2) unsaturated alicyclic compounds containing at least from 8 to 12 carbon atoms in the cyclic ring and containing at least one carbon to carbon double bond in the cyclic ring by intimately contacting said alicyclic compounds with a catalyst system comprising (A) at least one tungsten carbonyl complex compound selected from the group consisting of triphenylphosphine tungsten pentacarbonyl; tri-n-butylphosphine tungsten pentacarbonyl; bis(triphenylphosphine) tungsten tetracarbonyl; bis(phenylamine)-tungsten tetracarbonyl; bis(diethylamine) tungsten tetracarbonyl; bis(pyridine) tungsten tetracarbonyl; 2,2'-dipyridyl tungsten tetracarbonyl; orthophenanthroline tungsten tetracarbonyl; 3,4, 7,8-tetramethyl ortho-phenanthroline tungsten tetracarbonyl; diethylenetriamine tungsten tricarbonyl; 1,2,3-triaminopropane tungsten tricarbonyl; 2,2',2''-tripyridyl tungsten tricarbonyl; tris(acetonitrile) tungsten tricarbonyl; tris(proprionitrile) tungsten tricarbonyl; mesitylene tungsten tricarbonyl and toluene tungsten tricarbonyl and (B) at least one reducing agent selected from the group consisting of trialkylaluminum, dialkylaluminum halide, alkylaluminum dihalide, aluminum choride and aluminum bromide and wherein the molar ratio of (A)/(B) ranges from about 1/1 to about 20/1.

2. A process according to claim 1 wherein the (A) catalyst component is selected from a group consisting of orthophenanthroline tungsten tetracarbonyl and triphenylphosphine tungsten pentacarbonyl.

3. A process according to claim 1 wherein the (B) catalyst component is selected from a group consisting of alkylaluminum dihalide, aluminum chloride and aluminum bromide.

4. A process according to claim 1 wherein the unsaturated alicyclic compound is selected from a group consisting of cyclooctene and 1,5-cyclooctadiene.

5. A process according to claim 1 wherein the catalyst also comprises at least one compound selected from a group consisting of chlorine, bromine, iodine, cyanogen halides, peroxides, hydroperoxides and molecular oxygen.

6. A process according to claim 5 wherein molecular oxygen comprises one component of the catalyst system.

7. A process according to claim 1 wherein the unsaturated alicyclic compound employed is cyclooctene.

References Cited
UNITED STATES PATENTS

| | | | |
|---|---|---|---|
| 3,449,310 | 6/1969 | Dall'Asta et al. | 260—93.1 |
| 3,459,725 | 8/1966 | Natta et al. | 260—93.1 |
| 3,597,403 | 8/1971 | Ofstead | 260—88.2 |

JAMES, A. SEIDLECK, Primary Examiner

S. M. LEVIN, Assistant Examiner

U.S. Cl. X.R.

260—41 C, 80.78, 88.2 R; 252—428, 431